US007813750B2

(12) United States Patent
Hobby et al.

(10) Patent No.: US 7,813,750 B2
(45) Date of Patent: Oct. 12, 2010

(54) EMERGENCY RADIO COMMUNICATIONS SYSTEM INCORPORATING INTEGRAL PUBLIC SAFETY RADIO BRIDGING CAPABILITY

(76) Inventors: Patrick L. Hobby, 6322 Shea Pl., Highlands Ranch, CO (US) 80130; David E. Petty, 1388 Seven Lakes Dr., Loveland, CO (US) 80538

( * ) Notice: Subject to any disclaimer, the term of this patent is extended or adjusted under 35 U.S.C. 154(b) by 254 days.

(21) Appl. No.: 12/141,849

(22) Filed: Jun. 18, 2008

(65) Prior Publication Data
US 2009/0041206 A1 Feb. 12, 2009

Related U.S. Application Data

(63) Continuation-in-part of application No. 11/682,231, filed on Mar. 5, 2007.

(51) Int. Cl.
*H04B 7/00* (2006.01)
*H04B 3/30* (2006.01)
*H04M 11/04* (2006.01)

(52) U.S. Cl. .................. 455/521; 455/404.1; 455/404.2; 455/507; 370/285

(58) Field of Classification Search ............. 455/404.1, 455/507, 521, 404.2; 370/285
See application file for complete search history.

(56) References Cited

U.S. PATENT DOCUMENTS

| 2,103,857 | A | 12/1937 | Lindsey |
| 3,401,234 | A | 9/1968 | Heald |
| 3,701,024 | A | 10/1972 | Knowles et al. |
| 3,914,692 | A | 10/1975 | Seaborn, Jr. |
| 4,092,643 | A | 5/1978 | Stolarczyk |
| 4,559,526 | A | 12/1985 | Tani et al. |
| 4,652,859 | A | 3/1987 | Van Wienen |
| 4,670,739 | A | 6/1987 | Kelly, Jr. |
| 4,926,496 | A | 5/1990 | Cole et al. |
| 5,121,430 | A | 6/1992 | Ganzer et al. |
| 5,444,433 | A | 8/1995 | Gropper |
| 5,483,218 | A | 1/1996 | Roosa |
| 5,487,149 | A | 1/1996 | Sung |
| 5,497,149 | A | 3/1996 | Fast |

(Continued)

OTHER PUBLICATIONS

Virginia Department of Transportation Webpage, Northern Virginia Traffic Operations Center, http://www.virginiadot.org/travel/smart-traffic-center-nova.asp, Oct. 29, 2006 (from Internet Archive).*

(Continued)

*Primary Examiner*—Dwayne D Bost
*Assistant Examiner*—Larry Sternbane
(74) *Attorney, Agent, or Firm*—Sheridan Ross PC

(57) ABSTRACT

A communication system and method is provided for handling emergency situations wherein complex public safety radio systems can be used to directly communicate with normally incompatible radio systems used by organizations such as schools, hospital, and other facilities. The system includes a radio communication bridge that is selectively activated by emergency personnel to contact selected organizations. The bridge is activated via a TCP/IP command sent from an organization having activation privileges to the selected communication endpoints. Computer software or firmware installed at various communication endpoints, emergency responder locations, and at an emergency call center is used to facilitate functionality of the system to include emergency notifications, dissemination of information associated with a particular emergency, and the status of the system to include activation and deactivation of the radio bridge.

7 Claims, 13 Drawing Sheets

U.S. PATENT DOCUMENTS

| | | | |
|---|---|---|---|
| 5,509,054 A | 4/1996 | Garland | |
| 5,563,931 A | 10/1996 | Bishop et al. | |
| 5,889,474 A | 3/1999 | LaDue | |
| 5,955,947 A | 9/1999 | Sutsos et al. | |
| 5,960,337 A | 9/1999 | Brewster et al. | |
| 6,240,285 B1* | 5/2001 | Blum et al. | 455/404.1 |
| 6,272,120 B1* | 8/2001 | Alexander | 370/338 |
| 6,369,707 B1 | 4/2002 | Neer | |
| 6,377,172 B1 | 4/2002 | Neer | |
| 6,418,216 B1 | 7/2002 | Harrison et al. | |
| 6,687,339 B2 | 2/2004 | Martin | |
| 6,766,159 B2 | 7/2004 | Lindholm | |
| 6,876,858 B1 | 4/2005 | Duvall et al. | |
| 7,148,797 B2 | 12/2006 | Albert | |
| 7,212,111 B2 | 5/2007 | Tupler et al. | |
| 7,676,228 B2* | 3/2010 | Olivier et al. | 455/439 |
| 2002/0080025 A1 | 6/2002 | Beattie | |
| 2002/0131397 A1 | 9/2002 | Patel et al. | |
| 2005/0148316 A1 | 7/2005 | Laatu | |
| 2005/0170808 A1* | 8/2005 | Hamilton | 455/404.1 |
| 2005/0170819 A1 | 8/2005 | Barclay et al. | |
| 2005/0221794 A1* | 10/2005 | Grosser et al. | 455/404.1 |
| 2005/0267651 A1 | 12/2005 | Arango et al. | |
| 2006/0019655 A1* | 1/2006 | Peacock | 455/426.1 |
| 2006/0046697 A1* | 3/2006 | Koren et al. | 455/412.2 |
| 2006/0080344 A1* | 4/2006 | McKibben et al. | 707/100 |
| 2007/0232293 A1* | 10/2007 | Goldman et al. | 455/426.1 |
| 2008/0037461 A1* | 2/2008 | Biltz et al. | 370/328 |
| 2008/0220801 A1 | 9/2008 | Hobby et al. | |
| 2008/0274761 A1* | 11/2008 | Block et al. | 455/517 |

OTHER PUBLICATIONS

Monroe County (New York) Regional Traffic Operations Center Webpage, http://www.monroecounty.gov/dot-rtoc.php, May 2002.*

Mayer-Schönberger, V, "The politics of public safety communication interoperability regulation," Kennedy School of Government, Harvard University, 2005.*

Guide to Radio Communications Interoperability Strategies and Products, National Law Enforcement and Corrections Technology Center, Rome, NY, Apr. 2003.*

Official Action for U.S. Appl. No. 11/682,231, mailed Dec. 29, 2009.

* cited by examiner

Fig. 12

EMERGENCY RADIO COMMUNICATIONS SYSTEM INCORPORATING INTEGRAL PUBLIC SAFETY RADIO BRIDGING CAPABILITY

CROSS REFERENCE TO RELATED APPLICATION

This application is a continuation-in-part of application Ser. No. 11/682,231 filed on Mar. 5, 2007, entitled "Emergency Communications System", the entire disclosure of which is hereby incorporated by reference.

FIELD OF THE INVENTION

The present invention relates to communication systems incorporating multiple communication modes, and more particularly, to an emergency communication system for bridging incompatible radio communication elements.

BACKGROUND OF THE INVENTION

Many organizations have internal radio systems to manage day-to-day operations to include organization security. Various staff or security personnel may be equipped with radios enabling basic two-way communications between personnel. For many years, emergency or first responders such as law enforcement and fire departments have used radios for communications.

Because of the required range and necessity for reliability, government officials communicating by radio are typically equipped with highly advanced radio systems that are unable to directly communicate with the less complex radio systems used by organizations. When there is an emergency incident occurring at an organization, the standard method to contact emergency responders is by a telephone call to 911. A 911-call center is able to obtain the location of the caller in order to dispatch emergency responders. However, emergency responders have no direct means of radio communication with personnel located at the emergency location. Regardless of the nature of the incident and the identity of the emergency responders, it is very difficult for organizational personnel to directly speak with the responders prior to the responders arriving at the location.

Many emergency situations are time critical and the ability for organizational personnel to provide instantaneous information as to the status of the emergency can make the difference between emergency responders properly handling the situation as opposed to such responders not having adequate information, and the emergency situation then turning into a tragedy. No matter the type of emergency situation, the ability to provide accurate and timely information by those directly affected by the emergency situation often results in a more complete and rapid response by emergency responders.

Emergency responders typically have two-way radios installed in their vehicles to allow rapid and reliable communication between these emergency responders and their dispatch center or PSAP to control and coordinate their emergency actions. Many police officers and firemen also carry hand held radios that operate on the same radio system. Because of the necessity to ensure that emergency responders have the ability to communicate with one another, Federal regulations limit the types of organizations that may operate on the same frequency bands as emergency personnel. As mentioned above with respect to organizations who use two-way radio systems for daily operations, these radio systems are not able to communicate with emergency radio systems since each operate on very distinct frequencies, and the nature of the RF signals produced during the communications are very different. Therefore, other than the 911 telecommunications, affected personnel at the organization cannot communicate with emergency responders until they arrive at the scene.

Therefore, there is a need for a system and method whereby direct communications can be facilitated between emergency responders and affected organizational personnel during emergency situations. Additionally, there is need to provide a communication system where organizations can avoid the expense of purchasing more sophisticated and expensive radio communication systems, and the ability to directly communicate with emergency personnel can be on a selective and controlled basis. Additionally, there is a need to provide a communication system that may timely inform a network or group of organizations regarding an emergency situation coupled with the ability of a 911 call center to select which organizations within the group can directly communicate with selected emergency response personnel.

SUMMARY OF THE INVENTION

In accordance with the present invention, a communication system and method is provided for handling emergency situations wherein complex public safety radio systems can be used to directly communicate with normally incompatible radio systems used by organizations such as schools, hospitals, and other large independent facilities. The system of the present invention includes a radio communication patch or bridge that is selectively activated by emergency personnel to contact one or more selected organizations. In a preferred embodiment of the present invention, the communication system further includes a communication network, such as a local area network (LAN) or a group of LANs and a high speed interconnecting network such as the Internet. Activation and deactivation of the bridge is achieved over the LAN(s). A computer server may be located at one of several locations such as at a 911 call center, school district headquarters, or school district security center. This server is used to monitor and control the emergency communication system with one or more communication endpoints that are linked to the server. Each of the communication endpoints, such as separate schools, each have an IP address that allows them to be connected over the network(s) by the server. Each of the communication endpoints also has their own local two-way radio system and a communication patch or bridge device that is activated or enabled by IP commands over the network(s). Activation of the bridge is typically prompted by a 911 call by the affected organization at the communication end point. The 911-call center then evaluates the particular emergency, and can selectively activate over the network(s) the radio bridge. Once the bridge is activated, personnel located at the communication end point can then directly communicate with the emergency responders who have been dispatched and who are operating their radios on the public safety radio system. The local radios at the communication endpoints operate on their normal frequency/channel and once the bridge is activated then the local radios are automatically merged with the public safety radio channel or talk group. When the bridge is deactivated, the radios cease to operate on the public safety radio frequency/channel and are automatically returned to their normal channel operation.

Functionality of the system is achieved through computer software or firmware installed at the 911-call center, at the location of the emergency responders, and at each communication end point. This software/firmware is used to facilitate a number of functions to include a communication tool wherein upon notification of an emergency, emergency instructions can be conveyed to each of the communication endpoints. A user having the requisite bridge activation/deactivation authority can control the communications bridge (s) established as well as emergency instructions. These instructions can be conveyed in the form of email messages coupled with audio and/or visual alarms that are triggered by designated types of email messages.

Other features and advantages of the present invention will become apparent from the following detailed description, taken in conjunction with the drawings.

BRIEF DESCRIPTION OF THE DRAWINGS

FIG. 12 is yet another user interface screen, namely, an administrator screen allowing necessary information for establishing a school as a communication endpoint within the system to include IP address information, and software user licenses;

DETAILED DESCRIPTION OF THE INVENTION

Figure 1:
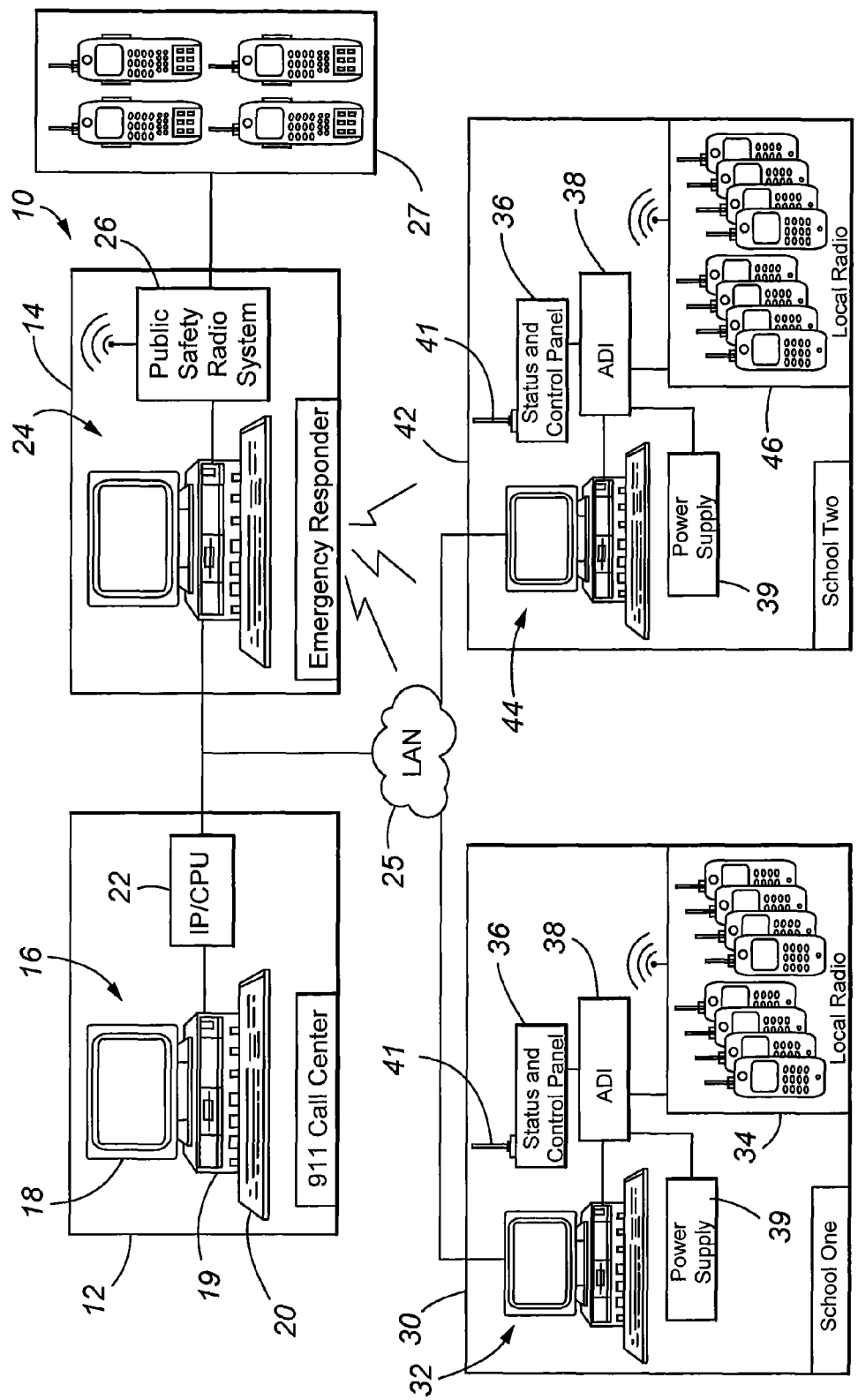
FIG. 1 illustrates a schematic diagram depicting the primary elements of the system of the present invention.

Referring first to FIG. 1, the communication system 10 of the present invention is illustrated. A 911 call center 12 is equipped with one or more computer processing units 16 which are able to administer 911 calls coming into the center and appropriately assigning actions to be taken by emergency responders located at responder location 14. A 911 call center computer/server 16 is shown as being conventional with a user interface such as a screen or monitor 18, a computer processor or server 19, and one or more input devices 20 such as a keyboard or a mouse. A separate Internet protocol/central processing unit (CPU) 22 is illustrated as being co-located within the 911-call center. This particular CPU 22 has computer-coded instructions in the form of firmware or software that facilitates the functionality of the present invention, as further discussed below. This CPU 22 may also be defined as a computer server with a connection to at least one local area network and the Internet, and can be located at any location most convenient for the users of the communication system. Although a separate CPU 22 is shown in the call center 12, it shall also be understood that the call center computer 16 could also be used to run the firmware/software of the system of the present invention; therefore, CPU 22 could be eliminated in favor of a single computing device/server. For the emergency responder location 14, it is also illustrated as having a conventional computer 24 that communicates with the 911-call center over a designated communication network, shown in FIG. 1 as a local area network (LAN) 25. The emergency responder location 14 is integrated within a public safety radio system 26. The public radio system 26 is also depicted as including a plurality of separate public radios 27, such as those that are in the vehicles or carried by police, fire, and emergency medical responders. FIG. 1 also illustrates two organizations which, when activated, may directly communicate with the public safety radios 27 of the emergency responders. Specifically, FIG. 1 illustrates two school locations 30 and 42. School 30 includes its own computer 32 that is linked by the local area network 25 to the 911-call center and the emergency responder location 14. School 30 also has its own local radio system 34 comprising a plurality of low powered radios. Like school 30, school 42 has its own computer 44 that is linked through the local area network 25 to the 911-call center 12 and the emergency responder location 14. School 42 also has its own local radio system 46 including a plurality of low powered radios. The radios used at locations 30 and 42 may be alike or different in terms of range, frequency, and other specifications. Schools 30 and 42 each have installed at their location an advanced digital interpreter (ADI) or bridge device 38 that achieves the bridge or patch enabling direct radio communications between the school radios and the public safety radio system. One example of an acceptable bridge or patch device that can be used in the present invention includes a C250 mobile multi-switcher interoperability controller sold by New Communications Solutions LLC of Norcross, Ga. The ADI 38 may have a dedicated power supply 39, such as a battery, that enables the ADI to continue to operate despite loss of power at the organization. The ADI may also be powered on the same grid power that powers the organization. A status and control panel 36 may be provided to enable the organization to have limited control over the communication bridge with the public radio system, as well as serving as a base radio for communicating with the other local radios. FIG. 1 also illustrates that the communication endpoints 30 and 42 also include respective antenna units 41 that are installed at the locations. These antennas in most circumstances would be required to ensure proper reception and transmission when the ADIs 38 are activated. The emergency responder location and each of the communication endpoints also have the appropriate firmware or software incorporated into their respective computer systems that enable the various functions of the system.

Figure 2:
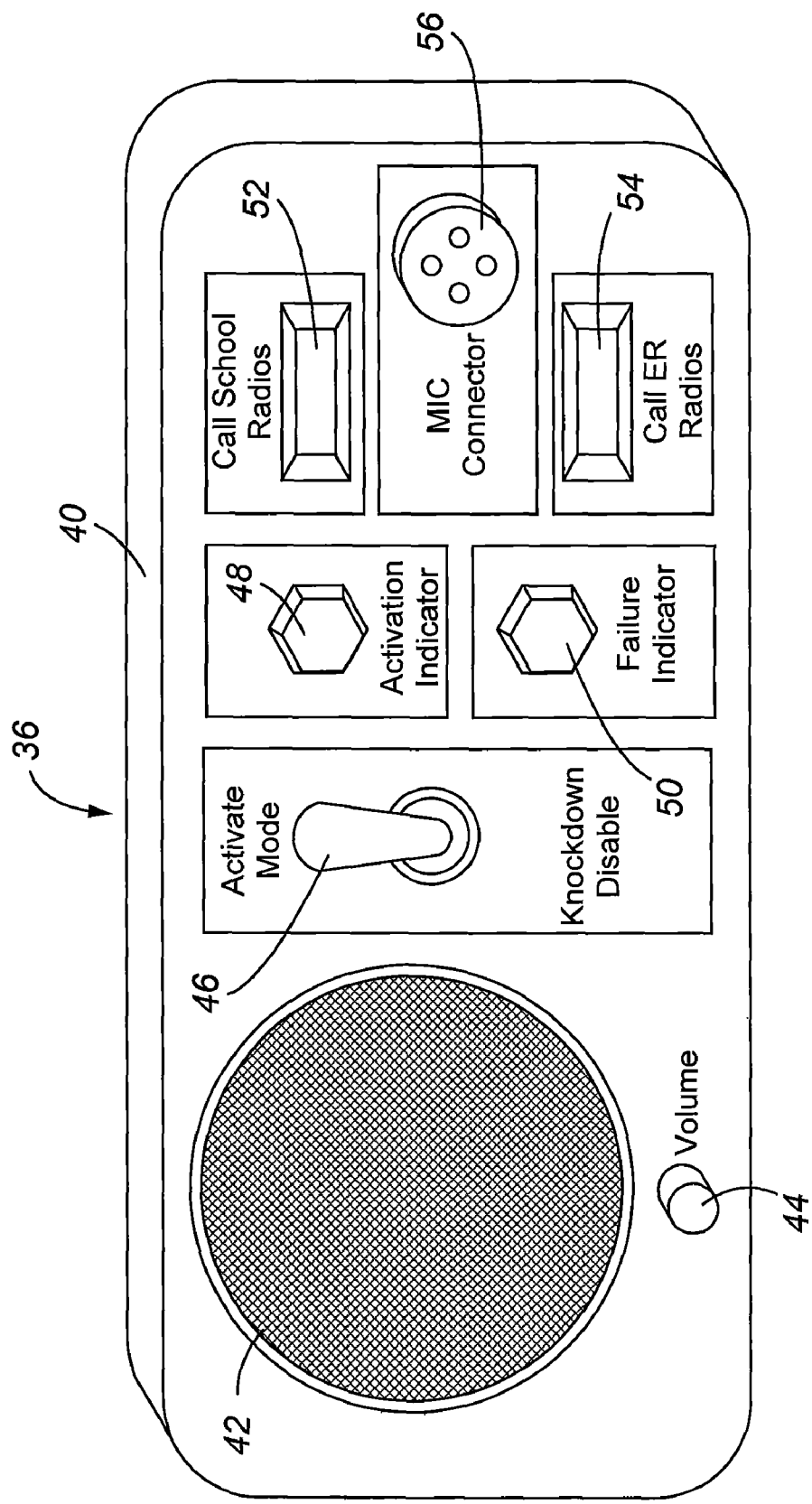
FIG. 2 is a schematic diagram of a sample local control panel installed at a communication endpoint that can be used to facilitate communications in the system of the present invention.

FIG. 2 illustrates features of the status and control panel 36 that may be incorporated at the communication endpoints. This status and control panel is a local radio 34/46 coupled with features to control or monitor the status of the ADI 38. As shown, the control panel has a housing 40 that contains the local radio. A monitor/speaker 42 is provided with a volume control 44. Push to talk buttons 52 and 54 may be provided to enable the user to call either the local school radios by pressing button 52, or contacting the emergency responders by pressing the button 54. Various indicators may be provided to show the systems status. Activation indicator 48 indicates whether the emergency communication system has been activated. Failure indicator 50 indicates for example whether there has been some type of failure, such as loss of power, failure of the bridge connection provided by ADI 38, and/or knockdown of the bridge by the 911-call center. A switch 46 may also be provided to enable the user to maintain the system in an activated mode, or to disable the communication bridge, as may be instructed by emergency responders or the 911 call center.

During an emergency, one of the locations 30 and 42 contacts the 911-call center, either by telephone, or through the local area network. In the event contact of the 911-call center was conducted through the local area network, it is also contemplated that the communication endpoints have VOIP telecommunications capability. Once the call center receives the notice of the emergency, the 911-call center selectively activates operation of the ADIs 38 located at one or both of the communication endpoints. The IP/CPU 22 is responsible for processing the activation request to each of the ADIs 38. Once the ADI(s) are activated, the activated end point(s) would then have the capability to conduct direct radio communications between users of the local radios 34/46 and the emergency responders carrying the public safety radios 27.

Figure 3:
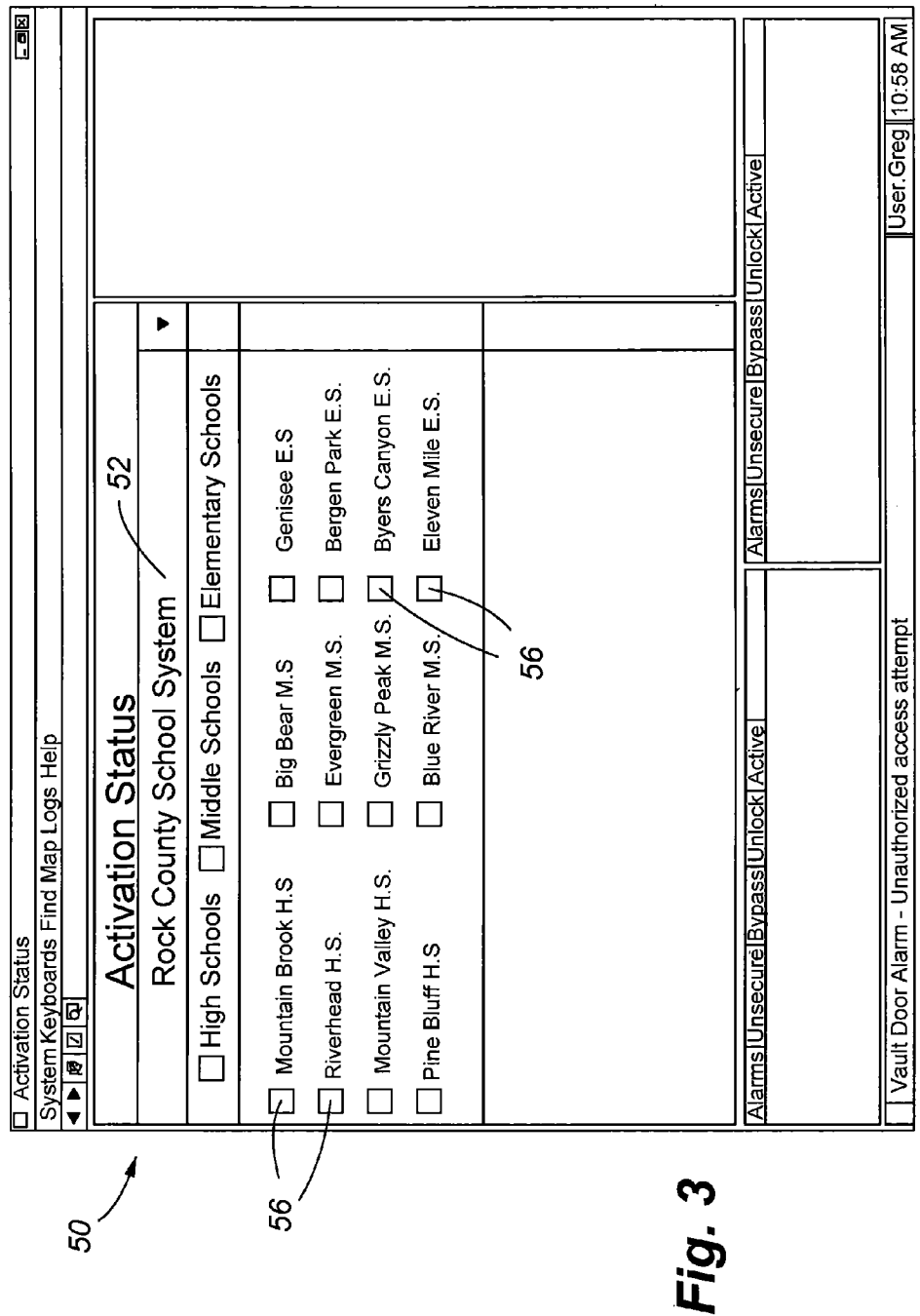
FIG. 3 is an example user interface screen associated with a computer processor having firmware or software that incorporates the functionality of the present invention.

With reference now to FIG. 3, a sample user interface screen 50 is shown. The local area network(s) may be divided into various functional units, such as school systems, shopping malls, and others. In the user screen 50, the functional group shown is a school system 52. Once the user selects the desired functional group, additional information is displayed on that selected group to include each of the separate communication endpoints 56 within the functional group. In the example of FIG. 3, the endpoints 56 are shown as the collective group of schools within the selected school system, namely, high schools, middle schools, and elementary schools. The communication endpoints 56 correspond to the example schools 30 and 42 illustrated in FIG. 1. As discussed further below with reference to FIG. 4, an activation status is provided for each of the communication endpoints. In FIG. 3, a communication bridge has not been activated for any particular school.

Figure 4:
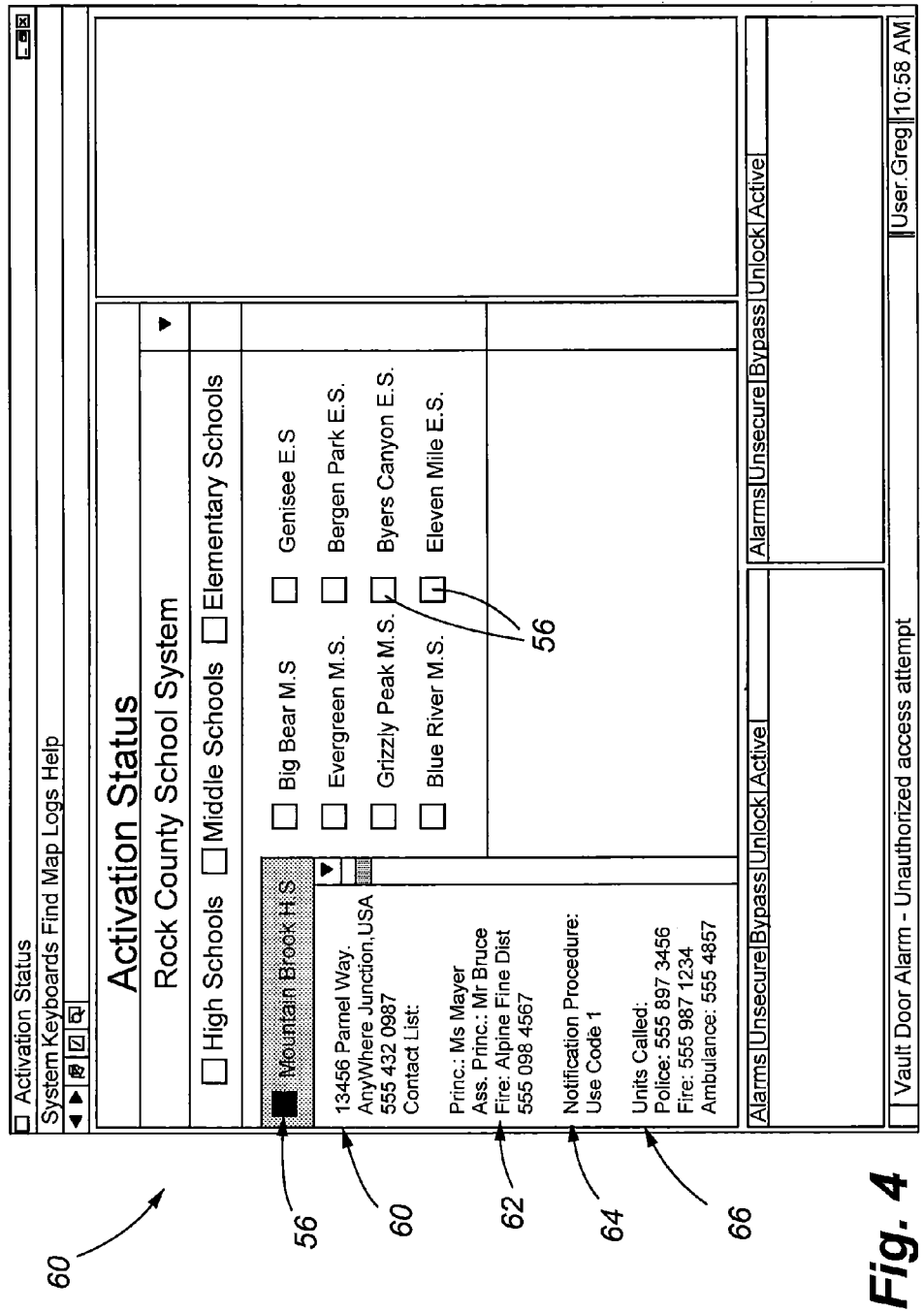
FIG. 4 is another user interface screen illustrating functionality with respect to activation of the radio bridge.

Referring now to FIG. 4, another user screen 60 is provided that illustrates information that may be displayed when any one of the communication bridges has been activated at a corresponding communication end point 56. In the example, the communication end point 56 referred to as Mountain Brook High School is shown in an activated state. During activation, information is available for viewing by the user to include the location 60 of the school, a contact list 62 of key personnel, and appropriate phone numbers associated with the location or key personnel. Other information may also appear on the user screen, such as a notification procedure 64, which could indicate a request by the 911-call center for the school to conduct a particular procedure. For example, one procedure could be the method by which key personnel at the communication end point notify others of the emergency. Another procedure could be the instructions for how emergency responders will contact designated school emergency personnel during the emergency. For this procedure, the instructions may relate to specifically how school emergency personnel are allowed to operate their local radios that communicate directly with the public safety radios of the emergency responders. The user screen 60 may also display which particular emergency responders have been dispatched to the location, shown as units dispatched 66.

Figure 5:
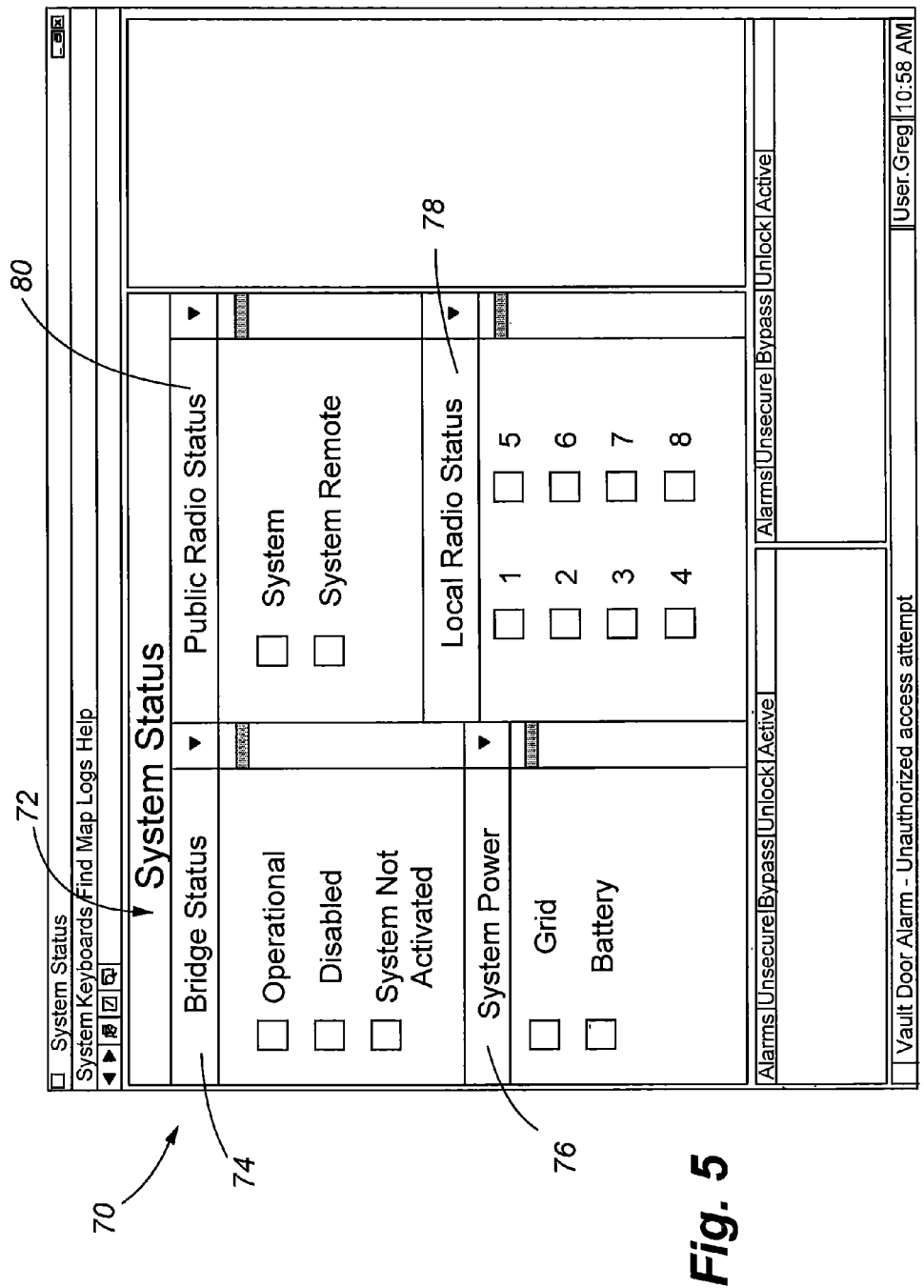
FIG. 5 is another sample user interface screen, but illustrating functionality with respect to a system status.

FIG. 5 illustrates another sample user screen 70 that may be displayed to show a system status 72. This screen may be used to supplement or replace the indicators shown on control panel 36. In this screen, separate fields may be provided to show the operational status of various elements within the communication system. For example, the status of the communication bridge between the local radios 34/46 and the public safety radios 27 may be illustrated by bridge status 74 indicating whether the overall system is operational, and/or whether the bridge has been activated or disabled. This screen also illustrates the status of system power 76, such as whether the communication end point is being run on battery power or grid power. Screen 70 further provides indicator 78 that shows the operational status of the local radios 34/46, and indicator 80 that shows the status of the public radio system used by the emergency responders. Indicator 80 may provide information on the operational status of the overall public radio system, or various remote system components, such as the individual public safety radios 27. On this particular screen, the status of the various fields may be provided by highlighting the status boxes next to the fields, as well as pull-down menus associated with each field that explains the status indicated.

With respect to the method of the present invention, it is contemplated that activation of the ADIs 38 would be controlled primarily by the 911-call center 12 or the emergency responders through their central location 14. In exceptional circumstances, the control panel 36 might be used to activate or disable the communications bridge by appropriate toggling of the switch 46. With respect to specific capabilities provided by the ADI 38, it is also contemplated that the ADI 38 could control the communication bridge or patch between one or all of the local radios 34/46, such that only selected radios at the communication endpoints could directly communicate with the public safety radios of the emergency responders. Some confusion may be avoided by limiting the number of radio communicants.

Figure 6:
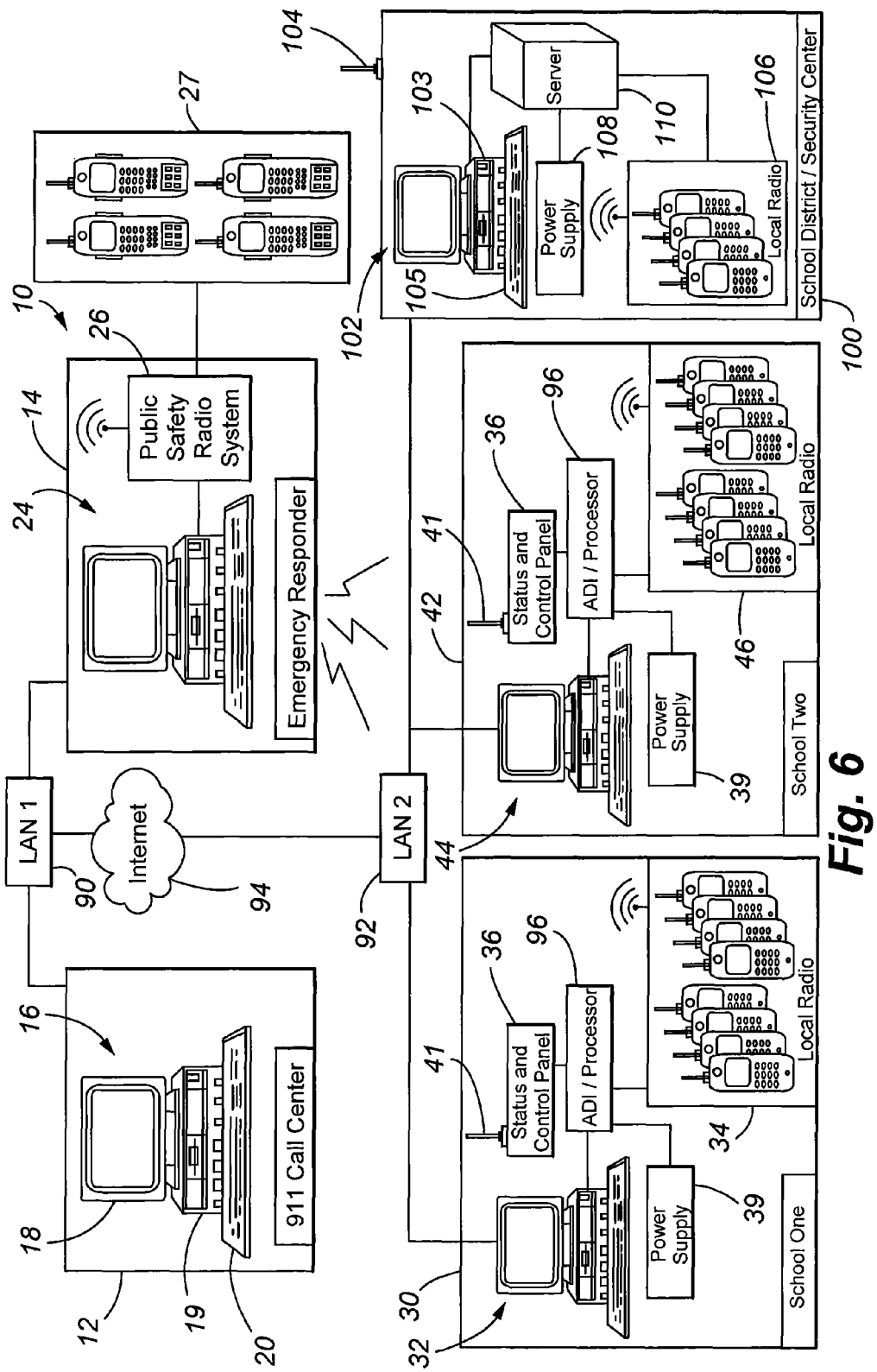
FIG. 6 is another schematic diagram depicting the primary elements of the system of the present invention in another embodiment.

Now referring to FIG. 6, in another embodiment of the invention an additional communication endpoint is illustrated, namely, a school district headquarters or school district security center 100. At that location, a communications server 110 is provided that has installed thereon computer coded instructions in the form of firmware or software that also facilitates the functionality of the present invention, as set forth further below in the discussion of the user interface screens. This server is used to manage communications between the school district/security center, the individual schools, as well as the 911 call center and emergency responders. The hardware associated with this server may be conventional, and configured to handle the necessary communications between the communication endpoints in accordance with the required internet protocol being used. A dedicated power supply 108 may be provided to power the server in the event there is a loss of power from the power grid. This location 100 may also have its own screen or monitor 102, computing device 103, and input device such as a keyboard or mouse 105. The school district/security center 100 is also illustrated as having its own local radios 106, as well as antenna 104 to facilitate the wireless link between the radios 106 and the public safety radio system. FIG. 6 also illustrates schematically another example of how the communications may take place between the different endpoints. In FIG. 6, it is shown that the emergency responder 14 and 911 call center 12 may have their own local area network 90, while school 1 and school 2, and the school district/security center have their own by local area network 92. When the bridge is established between the public safety radio system and the schools/school district, a high speed transport system such as the Internet/World Wide Web 94 is the interconnecting communication network. As understood by those skilled in the art, the server 110 may be coupled with routers or switches, which direct the designated communications to the correct communication endpoints. It shall also be understood that the server can perform other traditional server functions, such as maintaining user privileges, storing archival history, and updating configurations among the communication endpoints. The server 110 also has the ability to enable e-mail or text messages to any other networks in which the bridge has been established, as discussed further below with respect to the establishment of notification groups by e-mail. The server 110 can also be programmed to provide other services such as voice-over Internet protocol (VoIP). The software/firmware of the invention is installed at each of the communication endpoints and may be specially configured based upon the type of organization that is located at that communication endpoint. For example, a particular school may only have the capability to view notification screens, while other communication endpoints like the school district may have the capability to activate the communication bridge as well as view any notifications. It shall be understood that the specific software associated with the present invention may therefore by configured to display only the desired information at the designated communication endpoint. Connections to the local area network and status and activation commands are configured and monitored by the network server 110. So long as the communication endpoints maintain a valid connection to their corresponding local area networks, properly configured software at the communication endpoints can perform the functions of the invention, such as activating the communication bridge or monitoring system messaging. The communication endpoints ability to interact with terminal operators/users and other software applications is an additional functionality that enhances the primary purpose of providing the direct voice communications between the various radio user groups.

FIG. 6 also illustrates that each of the ADIs 96 may be configured as stand-alone units where each unit has its own computer processor to include data storage, software and IP communications capability combined with the ADI functionality. Accordingly, the ADIs in this embodiment are labeled as ADI/Processors and each has its own IP address corresponding to the particular communication endpoint in which it is installed. An IP packet sent in a command from an activating party over the communication network(s) will be received by the selected IP address(es) corresponding to the designated ADI/processor(s), and the processor(s) will then trigger their coupled ADI(s) to make bridges with the designated communication endpoint(s), or to knockdown the bridges if the activating party wishes to deactivate the bridges. In one preferred configuration of the present invention, there is a dedicated ADI for each local radio to be bridged, but only one processor is required to interface with the multiple ADIs. Accordingly, it shall be understood that the symbol ADI/Processor 96 in FIG. 6 can also mean multiple ADIs if multiple local radios are to be bridge at the communication endpoint.

Figure 7:
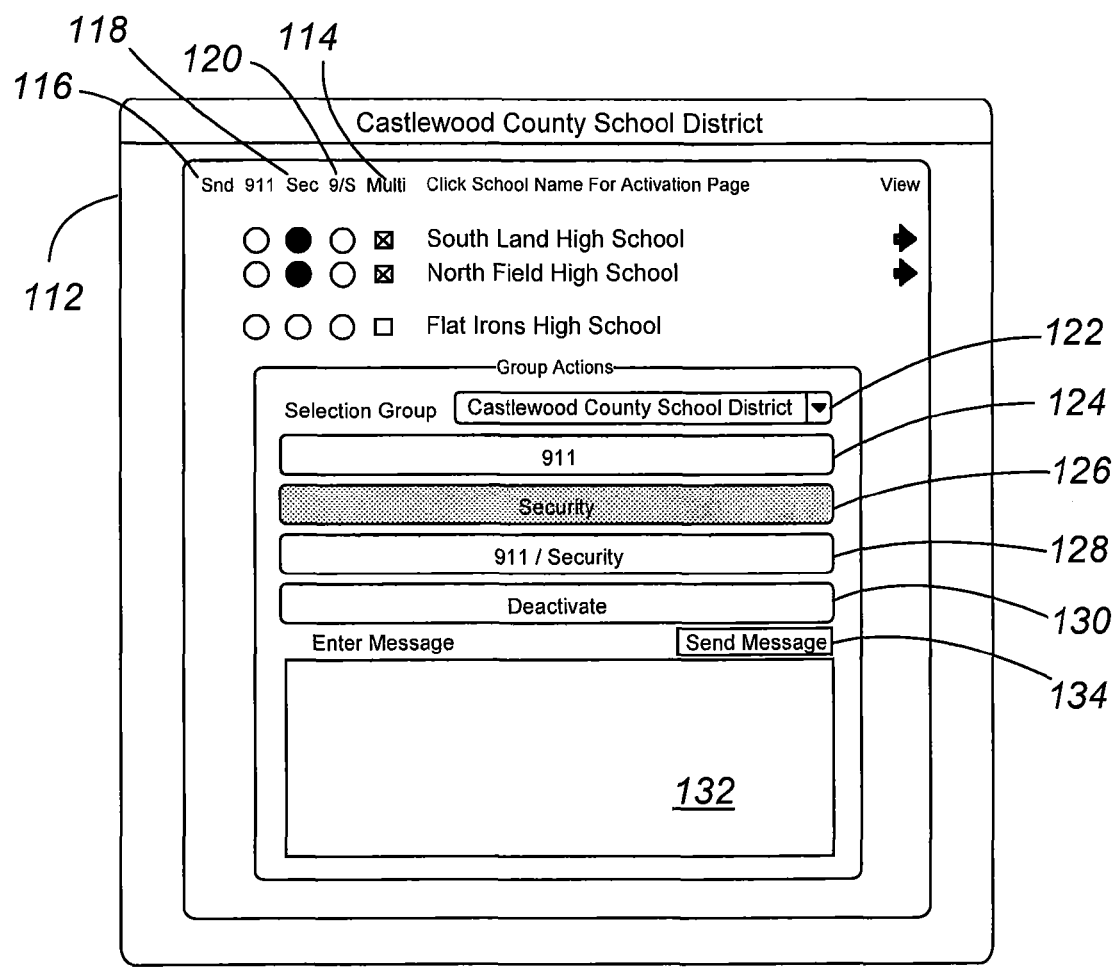
FIG. 7 is another example user interface screen associated with the present invention, namely, a school district activation screen.

Referring now to FIG. 7, a school district activation screen 112 is illustrated, and can be viewed at an operator terminal located at the school district/security center location 100. Authorized users can use this screen to activate, deactivate the bridge and send messages to intended recipients. There are two types of activations that may occur, namely, a bridge activation between emergency responders and the schools/school district (a 911 activation), and activation of the bridge between the schools and the school district/security center (a security activation). In order to activate a bridge, the user would select the school or schools by clicking on the square icon in the "multi" column 114. Once the schools were selected, the user would then select the desired activation bar, namely, a 911 activation 124, a security activation 126, or both a 911 and security activation 128. In the example of FIG. 7, the user has selected to bridge the radios between the school district/security center 100 and the selected school locations as indicated by the highlighted security bar 126.

The security icons 118 are displayed in different colors or shading, indicating their activated status. In this screen, two of the three schools show an activated bridge status, namely, South Land High School and North Field High School. Also in the example of FIG. 7, the particular selection group is the Castlewood School District. The pull down menu 122 allows the user to select the particular group for activation/deactivation. Each group may comprise different groupings of communication endpoints. Bar 130 allows the user to deactivate all or selected ones of the activated communication endpoints. This deactivation is achieved by selecting the corresponding square icon 114 for the particular school, and then selecting the deactivate bar 130 to deactivate the bridge between those selected communication endpoint(s). FIG. 7 also illustrates a message window 132 in which the user may enter free form text for the sending of e-mail messages to the schools within the selection group. Accordingly, the user would type in the message within the message window and select the send message button 134 in order to e-mail the messages to the members of the selection group. Once a communication endpoint has been deactivated, the icon returns to its normal or uncolored status.

Figure 8:
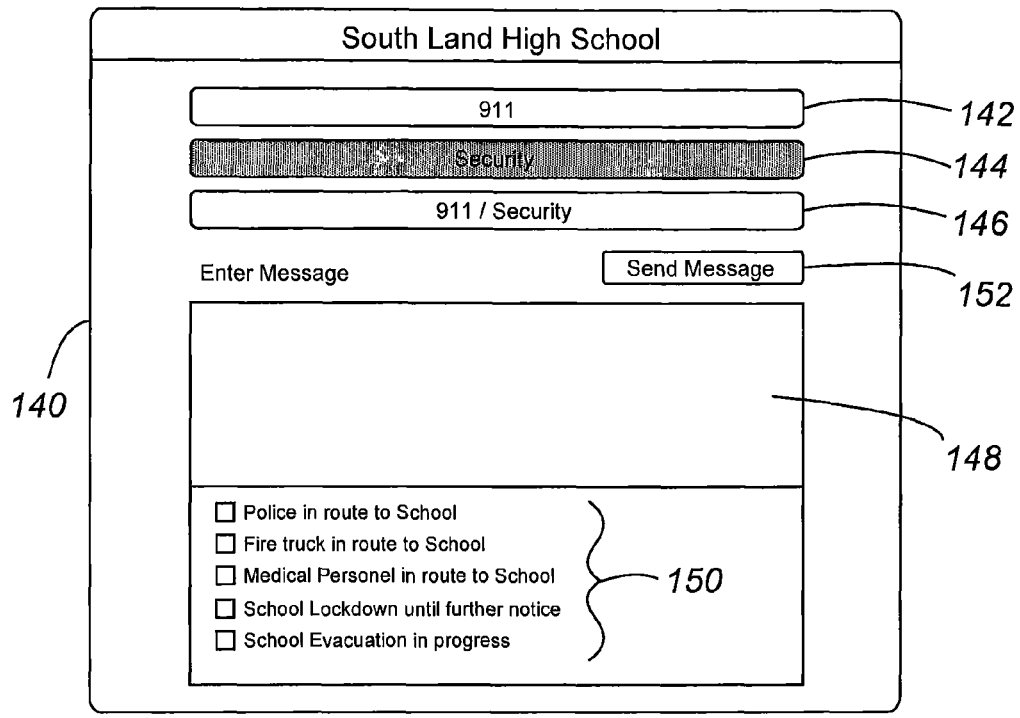
FIG. 8 is another user interface screen, namely, a school activation screen.

Now referring to FIG. 8, a school activation screen 140 is illustrated. This screen can be used if it is only necessary to activate or deactivate the communication bridge between a particular selected school and the emergency responders or school district/school district security center. The activation bars 142, 144, and 146 work in the same manner as the activation bars set forth above in FIG. 7 for bars 124, 126, and 128. In this example, the user has activated the communication bridge between Southland High School and the district security center by selecting bar 144. Screen 140 also includes a message window 148 for entry of free form text, as well as provision of a standard message group 150 in which the user can select the appropriate preconfigured message to send. As shown, the standard messages 150 include some that might be typical in an emergency situation at the selected school.

Figure 9:
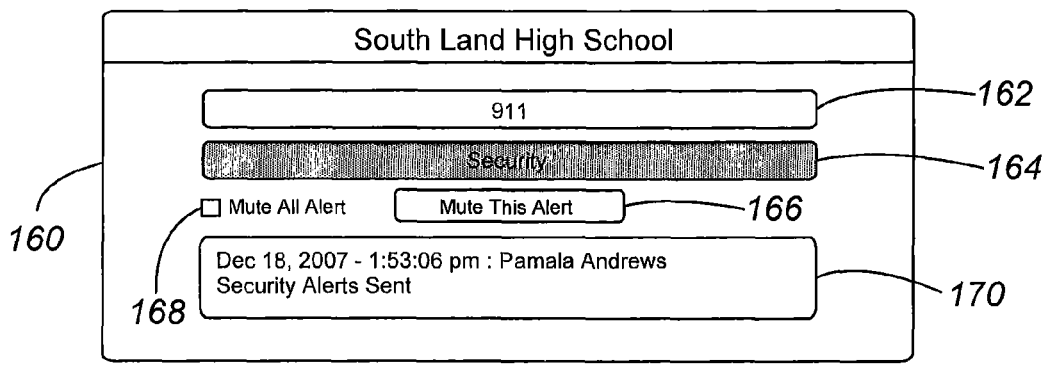
FIG. 9 is another example user interface screen, namely, a school notification screen.

FIG. 9 illustrates a notification screen 160 that can be viewed on user terminals without activation privileges. This screen displays the status of the selected school/location when an activation has been performed by other users within the system. An "alerting icon" can provide sound and a visual alert on the user's computer terminal that has notification software and privileges. Once the alerting icon alerts, the user can select a desktop icon to display this notification screen. On the notification screen, various items are shown to include which type of activation has occurred at that location. In the example, the two notification types can be viewed, namely the 911 activation 162 and the security activation 164. In this example, the security activation 164 has been made as indicated by the highlighted icon, thus the school district/district security center radio users can communicate directly with the school radio users. This notification screen also shows other features to include capability for the user to mute the audible/visual alert by selecting button 166, or by muting all of the alerts associated with the notification by selecting box 168, and then selecting button 166. Message window 170 provides details on the activation, to include the date, time, person responsible for activation, and any other notification information generated by the activating party.

Figures 10, 11:
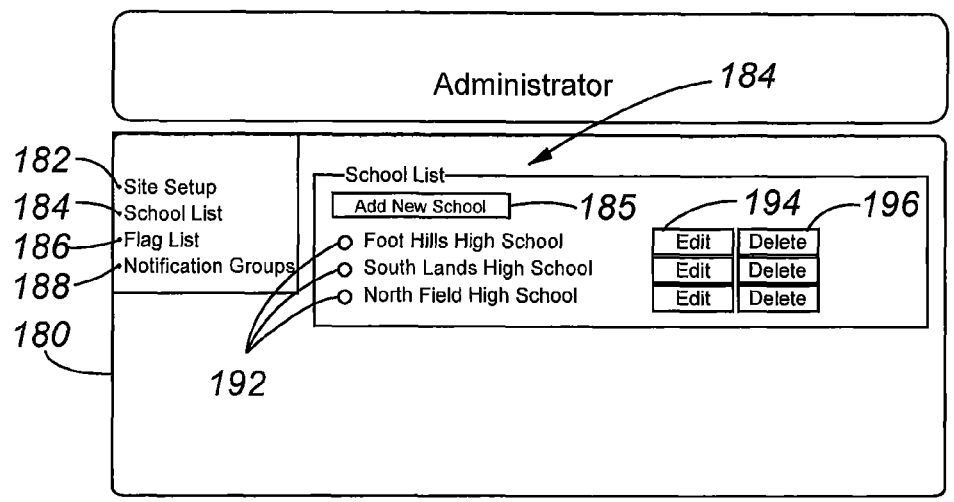
FIG. 10 is another user interface screen, namely, an administrator screen allowing the setup of various communication endpoints within the system, such as schools in a particular school district.
FIG. 11 is another user interface screen, namely, an administrator screen that is used to establish records for a particular school within the communications system.

FIG. 10 illustrates an administrator screen 180 that may be used by a system administrator in order to set up user locations on the communication system, establish types of user access, licenses, and other functions as explained below. Specifically, FIG. 10 shows a selection list of options for the administrator in setting up the system to include a site setup option 182, a school list option 184, a flag list option 186, and a notification group option 188. In FIG. 10, the school list option 184 is selected where the administrator may add new schools as communication endpoints, may edit communication capabilities or information on existing schools, or may delete schools. In the figure, three schools are shown 192 as being existing members of the school list. Selecting edit button 194 or delete button 196 for the listed school enables the administrator to edit information or access privileges for the school, or to delete the school from the listing.

Referring to FIG. 11, another administrator screen 180 is provided which enables the administrator to edit site information for each school/location that is a communication endpoint within the system. As shown, the site information block 198 enables the administrator to enter appropriate school/location information. Block 200 is provided for the administrator to view existing site software licenses, or to upload and submit new site software licenses to the server in order to grant additional users to the particular location and/or to change access privileges for the school/location.

Figure 12:
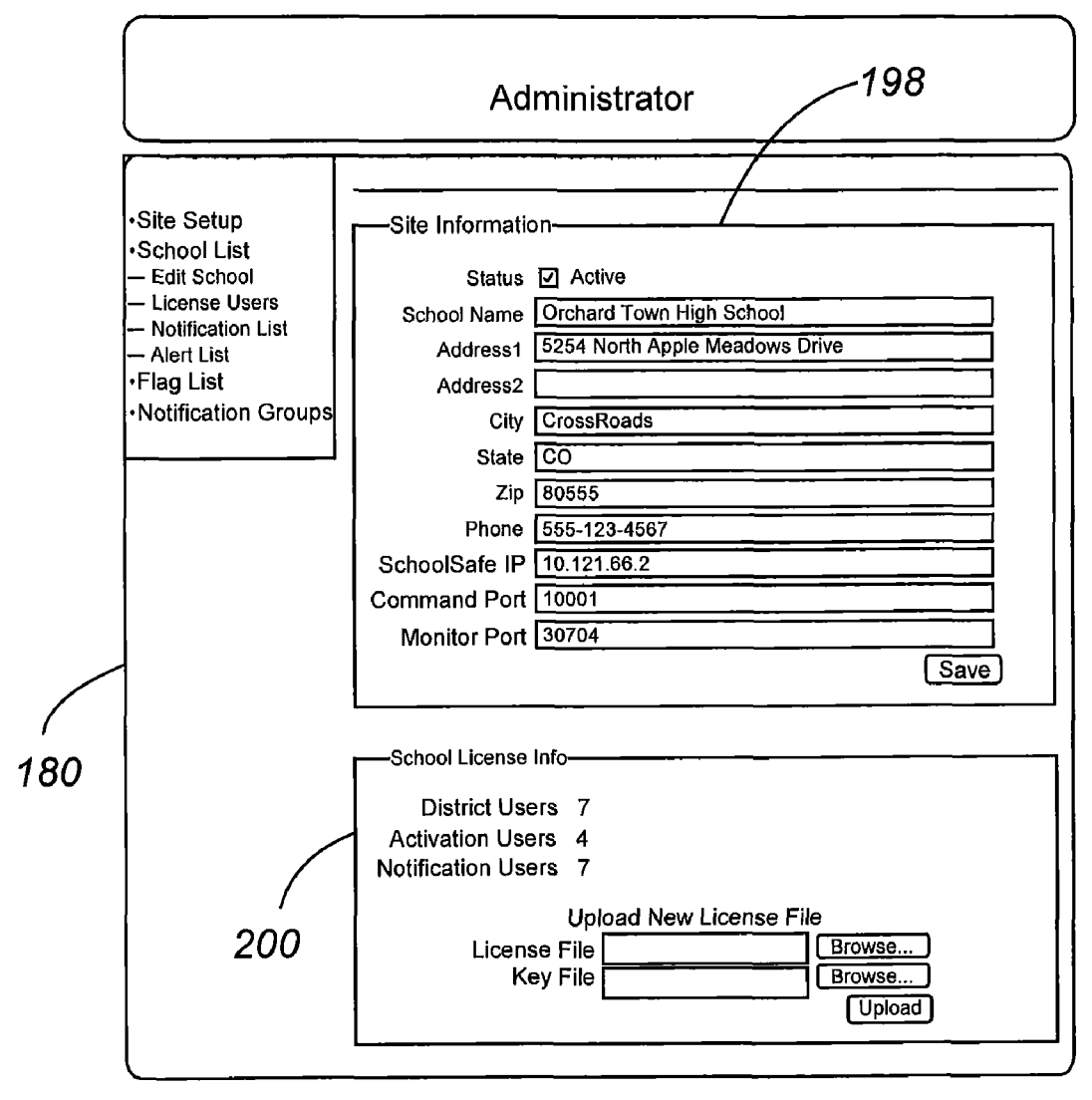

FIG. 12 is another administrator screen 180 that allows an administrator to enter or edit additional site information 198, to include the IP address for the particular site as a communication endpoint. The Command Port and Monitor Port refer to the data ports on the server 110 that allow the server to control and monitor the ADI/Processor 96 having the matching IP address located at that communication endpoint. FIG. 12 also shows additional license information 200 for a particular school/location. For example, this screen lists the number of district users, activation users, and notification users at that school location. As shown, the license information 200 also allows a user to upload new licenses to the server, and to assign the appropriate license and key files setting forth the requisite access privileges for new system users.

Figure 13:
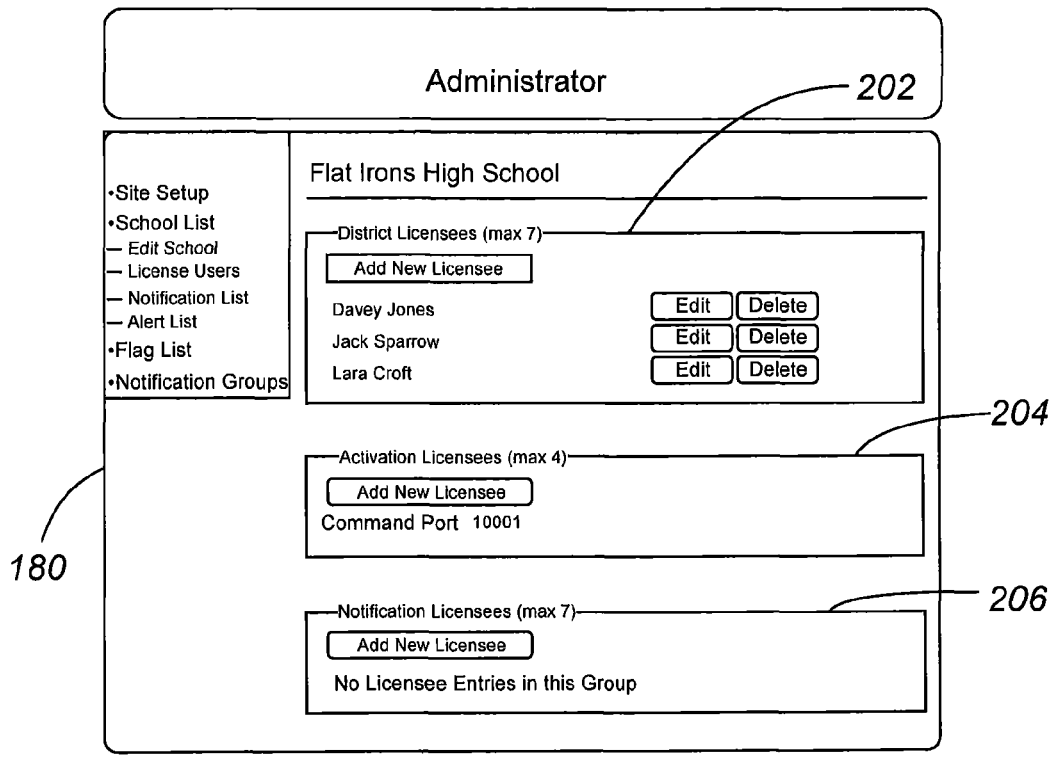
FIG. 13 is another user interface screen, namely, an administrator screen that tracks and records various software license types used within the system.

FIG. 13 is another administrator screen 180 that lists particular users 202 at a school/location. As shown, the administrator can edit or delete users, as well as to add users for that particular school/location. Block 204 on this screen also enables the administrator to add additional activation licenses for that location that correspond to a particular command port. Block 206 in FIG. 13 also allows the administrator to add new notification licenses for the location.

uninterrupted power supply for periods when primary AC power fails. Preferably, the radios, power supply, ADI/processor are housed in a module (not shown) that is installed in a secured location where power, LAN and antenna cabling can be accessed. The module itself may have status LEDS and a local control switch if the local area network should fail.

Figure 14:
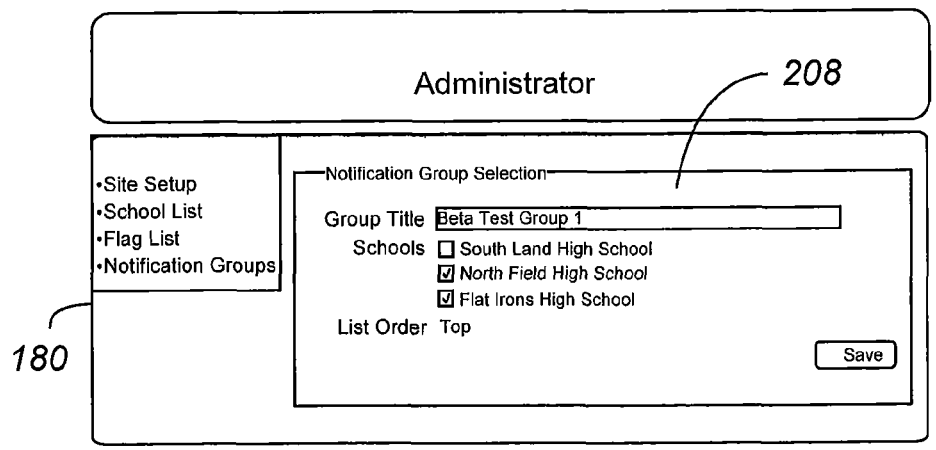
FIG. 14 is yet another user interface screen, namely, an administrator screen that is used to establish notification groups within the system.

FIG. 14 illustrates yet another administrator screen 180 used for setup of notification groups. In the example, the notification group 208 has been given the title BETA TEST GROUP 1, and includes three high schools. Two of the high schools are selected from the group, meaning that the administrator also has the ability to only select certain communication endpoints from the notification group to actually receive notifications during an activation. Thus, North Field High School and Flat Irons High School have been selected for receiving notifications, while South Land High School may be within the notification group, but has not been selected to receive notifications.

Figure 15:
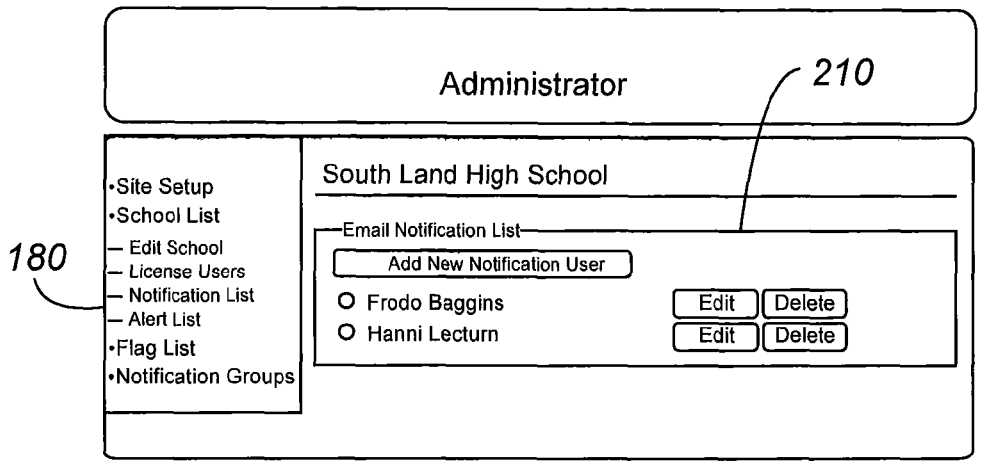
FIG. 15 is yet another user interface screen, namely, an administrator screen that is used for establishing e-mail notification lists within the system.

FIG. 15 illustrates yet another administrator screen 180 that allows an administrator to establish an e-mail notification list 210 for particular communication endpoints. In this example, the communication endpoint is South Land High School, and the personnel who receive e-mails during an activation include the two individuals listed in the screen, namely, Baggins and Lecturn. As shown on the screen, new notification users may be added to the e-mail notification list, existing members can be deleted, or member information can be edited. The various e-mail addresses of the notification list members are entered, and these members then automatically received e-mail notifications during an activation that may affect their communication endpoint. These notifications may also include the audio and/or visual alarms sent to their computer workstations.

Figure 16:
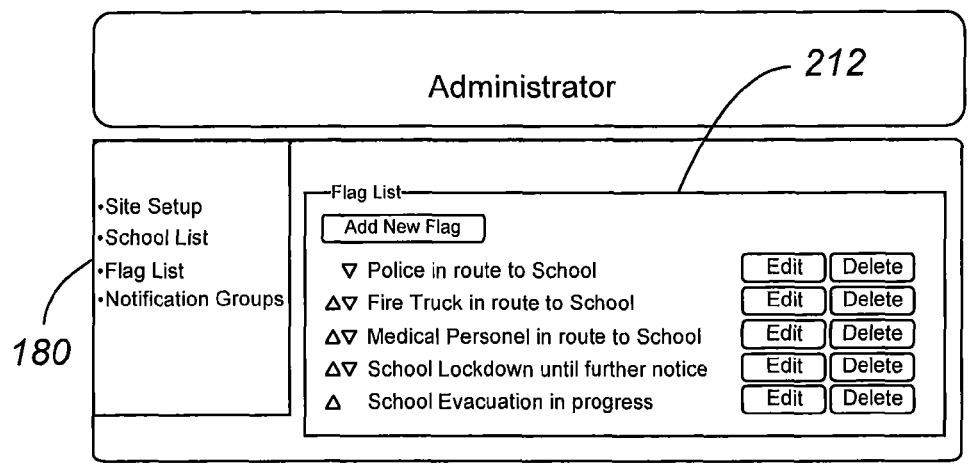
FIG. 16 is yet another user interface screen, namely, an administrator screen that is used to setup the pre-established or preconfigured message lists, referred to as a flags.

FIG. 16 is yet another administrator screen 180 that shows a particular flag list 212 that may be used as a messaging technique either by an activating party, or one of the communication endpoints. In the example, one of the standard messages is "Police in route to School", is a one-way message that can be sent from the emergency responders to the schools, as annotated by the single arrow pointing down. Another of the messages, namely, "School Evacuation in progress" is a one-way communication that is provided by the affected school back to the emergency responders, as annotated by the single arrow pointing up. There are three two-way standard messages listed, it being understood that either the activating party/emergency responders or the schools can send those messages.

Figure 17:
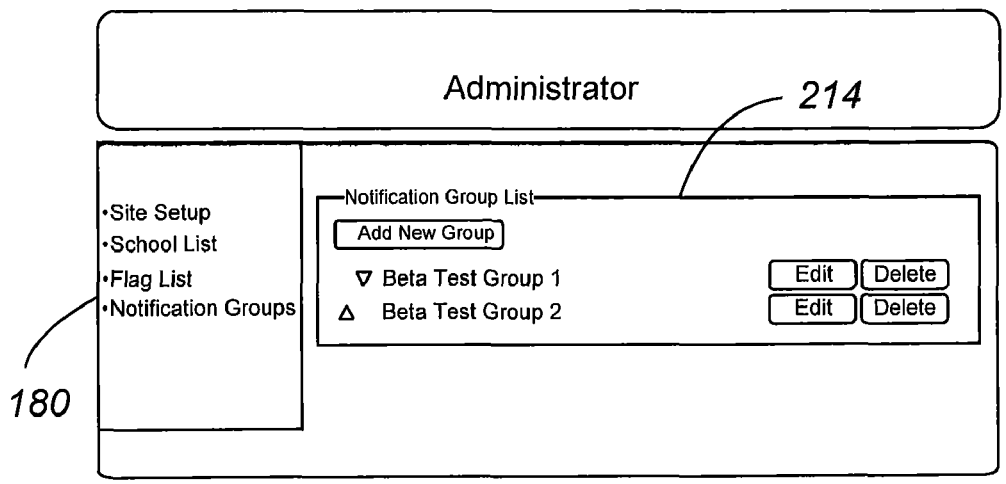
FIG. 17 is another user interface screen, namely, an administrator screen that is used to add, edit, or delete a notification group listing.

Referring to FIG. 17, another administrator screen 180 is shown that enables an administrator to add, edit or delete a particular notification group. As shown, the notification group list 214 includes two Beta test groups. If it is desired to add another notification group, then the administrator would select the "Add New Group" button. As mentioned with respect to FIG. 14, each communication endpoint within a notification group has its own IP address that can therefore be contacted by a party having activation privileges.

Figure 18:
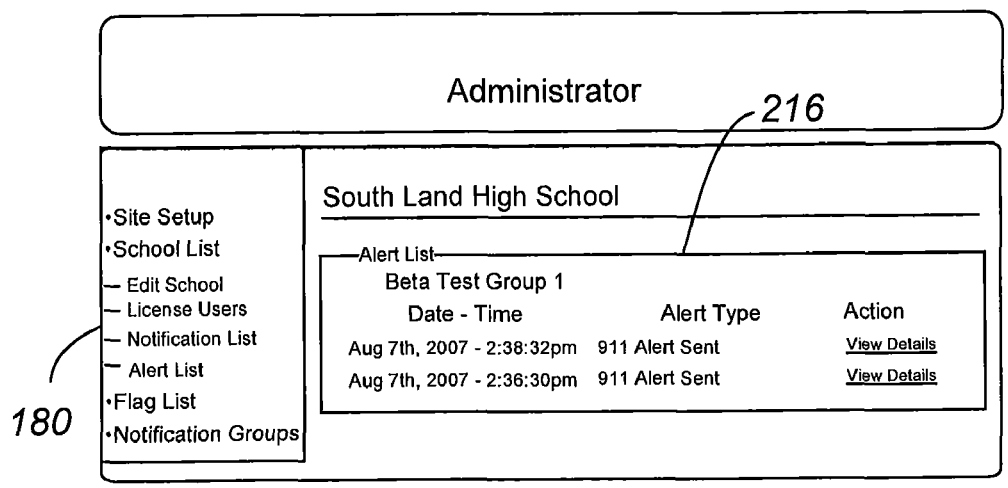
FIG. 18 is yet another user interface screen, namely, an administrator screen illustrating recorded alert messages previously sent within the system.

Referring to FIG. 18, a final administrator screen 180 is provided. In this screen, an alert list 216 is shown that provides a log of any or selected activations that may have occurred over a selected period of time. In the example, the alert list shows two alerts that occurred within Beta test group 1 on Aug. 7, 2007. In the alert list, the date, time, and type of alert are shown. By selecting the "View Details" buttons, the user can view other details (not shown) that may have been recorded about the activations occurring at those two times.

This alert list information can be used for official record keeping, and also for predictive actions to be taken in the future for communication endpoints that may have special needs.

By the foregoing, a method and system are provided for enhancing communications between emergency responders and personnel located at the communication endpoints. The communication bridge or patch may be selectively enabled or disabled. The communication brides between the endpoints, the 911 Call Center and emergency responders is achieved by commands issued over the Internet/Worldwide Web, and the number of communication endpoints can be easily tailored or modified by a sensor that manages communications between locations having their unique IP addresses. Organizations like schools may still maintain their local radio equipment, but have the capability to directly communicate with emergency responders on an as needed basis. Accordingly, organizations like schools maintain a public radio system capability, but without the great cost associated with such systems. The advanced digital interpreters also have other capabilities that not only enable or disable the capability of local radios to communicate with public safety radios, but also to control the specific manner in which the various local radios may communicate, such as by providing patch capability only to selected radios in the local radio set.

School personnel may carry hand-held UHF radios for normal communications within the school building. These portable radios are typically capable of being programmed to add additional UHF frequencies to minimize interference and to expand their capability to be used with public safety radios. During initial setup for each location to be a communication endpoint, each of the local radios are evaluated and programmed so they are capable of being bridged with the public safety radios. At the district level, VHF hand-held radios are preferred. In the event the local area network for the school district is down at a time when radio bridging is required, then the manual switch 46 on the local control panel may be used.

The ADI may utilize digital audio links between any band radio systems in either one channel or two channel modes. The bridge activation and deactivation is via web-based, graphical user interface screens, secured with log-on and network security measures. The system software can be configured as standard web-based applications. The server may utilize, for example, a Fedora Linux operating system. The three basic views in the user screens as discussed include a district activation view, a school activation view, and a notification view. The district view allows a district-wide list and status of bridging activations and alerts. The notification view only allows the user to view the status of designated bridging and alerts. The system administrator can manage the installed sites, licenses, users, and notification lists. The ADI has the intelligence to complete the radio links, report status, and process audio. The antennae systems for the radio units at the specific school locations are included to complete the radio signal link between the dissimilar radio networks. Backup power is provided at each location by an As disclosed, the ADI/processor can be a stand-alone unit integrated at each location to facilitate the bridge between the local radio users at that location and the public safety first responders. A command sent by the activating party in the form of IP packets over one or more communication networks is received by the ADI/processor, the command is recognized by the ADI as an instruction to either make the bridge or to knock down the bridge at that designated communication endpoint, and then the ADI facilitates the commanded bridging function. The radiating antennas at the user locations provide wireless links to the radio users at the location and the first responders. The public safety radio system often uses a radio tower or a collection of towers to provide links to their users, such as first responders which exchange dispatch voice messages with the 911 Call Center. The school district may have its own local area network with suitable network equipment, such as routers or switches. This local area network is connected to other local area networks via the Internet/Worldwide Web. The 911 Call Center and emergency responders may operate on their own local area network and which also communicate with the local area network school districts through a network transport or Internet connection. When the software associated with the invention is configured on terminals at each communication endpoint, users at those locations can operate the system in accordance with the privileges associated with the site software installation. As also discussed, the software installations at the various communication endpoints provides the proper indications and activation options enabling users to operate the system or to monitor the system. The software and the status and activation commands are configured and monitored by the network server. The number of communication endpoints, radios, and public safety communication endpoints is virtually unlimited in the present invention since radio bridging is web based. So long as each of the communication endpoints have their own IP addresses, the appropriate software can be installed at those locations to enable the communication bridges to be established between selected communicants, as established by an administrator of the system. As also mentioned, the server has the ability to manage e-mail or text messages to other networks in which activation has been achieved for selected communication endpoints. It is also contemplated that the server can be programmed to provide other services such as VOIP communications. Periodic testing can be conducted at the local control panels in order to ensure that the system is operating correctly at that location. Additional activation buttons/controls may be provided on the panels in order to accomplish these tests. These tests could also be processed at any operator terminal, to include testing of the integrity of the software to ensure the system as set up by the administrator is properly functioning.

While a system and method of the present invention have been set forth above with respect to a particular preferred embodiment, it shall be understood that various other modifications and changes may be made to the invention in accordance with the scope of the claims appended hereto.

What is claimed is:

1. A communication system especially adapted for facilitating emergency communications between communicants having respective radio systems, said system comprising:

a first computer processor located at an emergency call center location, said first computer processor including a first user interface and a first input means for inputting data in said first computer processor;

a second computer processor located at an emergency responder location, said second computer processor including a second user interface and a second input means for inputting data in said second computer processor;

a third computer processor located at a communication endpoint location such as a school, said third computer processor including a third user interface and a third input means for inputting data in said third computer processor;

a communications server for managing communications between users located at said locations;

a communications network interconnecting said communications server and said computer processors, said server and each said computer processor having respective IP addresses;

a public radio system comprising a plurality of public safety radios, at least one public safety radio being associated with said emergency responder location;

a local radio system comprising a plurality of local radios, at least one local radio being associated with said communication endpoint;

a radio bridge device for facilitating direct radio communications between said public safety radio system and said local radio system, said radio bridge being installed at said communication endpoint and including hardware means for enabling connection between the radio systems, said bridge further including a processor that communicates with said server to receive activation and deactivation instructions sent from an authorized user, said instructions being sent as IP packets over the communications network; and computer software means associated with said server and said computer processors for selectively controlling and monitoring the system to include activating and deactivating said radio bridge and producing visual displays on said user interfaces allowing a user to manipulate the functions of the system in accordance with specified user privileges and wherein:

said third computer processor includes a plurality of computer processors located at respective communication endpoints, such as school locations, each of said plurality of computer processors including corresponding user interfaces and corresponding input means for inputting data into said computer processors, and wherein said computer software means generates visual displays on the user interfaces, said visual displays including a school district activation screen showing (i) a listing of schools within the school district, (ii) a status of the radio bridge for each of the schools, (iii) a type of activation including at least one of a 911 activation, a security activation, or both a 911 and security activation, and (iv) a message window containing a message sent to selected schools within the district based upon the type of activation.

2. A system, as claimed in claim 1, further including:

a status and control panel located at said communication endpoint, said status and control panel including a plurality of indicators for monitoring a status of the local radio system and a status of the radio bridge.

3. A system, as claimed in claim 1, wherein:

said computer software means includes at least one of computer coded instructions or firmware that generates at least one user interface screen on at least one of said user interfaces for selectively activating and deactivating said radio bridge.

4. A system, as claimed in claim 1, wherein:

said communication endpoint includes a plurality of communication endpoints and a corresponding plurality of computer processors, user interfaces, and input means for inputting data in said system, and said software means generates visual displays on the user interfaces including at least one visual display including an administrator screen showing (i) configurable notification groups for receiving selected activations, (ii) a flag list setup for establishing preconfigured messages that may be sent to and received by said communication endpoint.

5. A method of facilitating radio communications between users having normally incompatible radio systems, said method comprising the steps of:

providing:

(i) a plurality of computer processors located at respective locations of the communicants, said computer processors communicating with one another electronically through at least one communications network wherein each computer processors have respective IP addresses;

(ii) a public radio system comprising a plurality of public safety radios, at least one public safety radio being associated with one of said locations such as an emergency responder;

(iii) a local radio system comprising a plurality of local radios, at least one local radio being associated with another location, such as a school;

(iv) a communications server for managing emergency communications between users located at said locations;

(v) a radio bridge device for facilitating direct radio communications between said public safety radio system and said local radio system, said radio bridge being installed at least at said another location and including hardware means for enabling connection between the radio systems, said bridge device further including a processor that communicates with said server to receive activation and deactivation instructions sent from an authorized user within said communication network, said instructions being sent as IP packets over the communications network in order to activate or deactivate a communication bridge between selected users;

(vi) computer software means associated with said computer processors for selectively controlling and monitoring the communication system to include activating and deactivating of the radio bridge and producing user interfaces allowing the users to manipulate functions of the system in accordance with specified user privileges; and selectively activating and deactivating the radio bridge based upon classification of a nature of an emergency at said another location, and wherein said user interfaces include visual displays containing information regarding the radio communications including (i) status of the radio bridge for each location, (ii) a type of activation including at least one of a 911 activation or a security activation, or both, and (iii) a message window containing a message sent to selected locations based upon the type of activation.

6. A method of facilitating radio communications between communicants having normally incompatible radio systems, said method comprising the steps of:

providing:

(i) a first computer processor located at an emergency call center location, said first computer processor including a first user interface and a first input means for inputting data in said first computer processor;

(ii) a second computer processor located at an emergency responder location, said second computer processor including a second user interface and a second input means for inputting data in said second computer processor;

(iii) a third computer processor located at a communication endpoint location such as a school, said third computer processor including a third user interface and a third input means for inputting data in said third computer processor;

(iv) a communications server for managing communications between users located at said locations;

(v) a communications network interconnecting said server and said computer processors, said server and each said computer processor having respective IP addresses;

(vi) a public radio system comprising a plurality of public safety radios, at least one public safety radio being associated with said emergency responder location;

(vii) a local radio system comprising a plurality of local radios, at least one local radio being associated with said communication endpoint;

(viii) a radio bridge device for facilitating direct radio communications between said public safety radio system and said local radio system, said radio bridge being installed at said communication endpoint and including hardware means for enabling connection between the radio systems, said bridge further including a processor that communicates with said server to receive activation and deactivation instructions sent from an authorized user, said instructions being sent as IP packets over the communications network;

(ix) computer software means associated with said computer processors for selectively controlling and monitoring the system to include activating and deactivating said radio bridge and producing user interfaces allowing a user to manipulate the functions of the system in accordance with specified user privileges;

sending an emergency notification to said emergency call center, said emergency notification comprising at least one of a telephone call to said emergency call center and an email sent to said emergency call center;

categorizing a nature of the emergency notification to determine whether direct radio communications are required between said local radio system at said communication endpoint and said public safety radio system; and selectively activating said radio bridge for facilitating direct radio communications between a first communicant using a public safety radio and a second communicant using a local radio, said selectively activating including transmission of an IP packet containing a command directed to the radio bridge device located at said communication endpoint wherein said IP packet is interpreted by the bridge device, and said bridge device changes a status of the local radio system such that radios in the local radio system can transmit and receive messages to/from radios in said public safety radio system; and wherein:

said third computer processor includes a plurality of computer processors located at respective communication endpoints, such as school locations, each of said plurality of computer processors including corresponding user interfaces and corresponding input means for inputting data into said computer processors, and wherein said computer software means generates visual displays on the user interfaces, said visual displays including a school district activation screen showing (i) a listing of schools within the school district, (ii) a status of the radio bridge for each of the schools, (iii) a type of activation including at least one of a 911 activation, a security activation, or both a 911 and security activation, and (iv) a message window containing a message sent to selected schools within the district based upon the type of activation.

7. A method, as claimed in claim 6, wherein:

said communication endpoint includes a plurality of communication endpoints and a corresponding plurality of computer processors, user interfaces, and input means for inputting data in said system, and said software means generates visual displays on the user interfaces including at least one visual display including an administrator screen showing (i) configurable notification groups for receiving selected activations, (ii) a flag list setup for establishing preconfigured messages that may be sent to and received by said communication endpoint.

* * * * *